(12) United States Patent
Hassell

(10) Patent No.: US 7,922,014 B2
(45) Date of Patent: Apr. 12, 2011

(54) STORAGE RACK

(75) Inventor: Jon P. Hassell, Atlanta, GA (US)

(73) Assignee: Rehrig Pacific Company, Los Angeles, CA (US)

( * ) Notice: Subject to any disclaimer, the term of this patent is extended or adjusted under 35 U.S.C. 154(b) by 835 days.

(21) Appl. No.: 11/577,510

(22) PCT Filed: Nov. 23, 2005

(86) PCT No.: PCT/US2005/042623
§ 371 (c)(1),
(2), (4) Date: Apr. 19, 2007

(87) PCT Pub. No.: WO2006/058166
PCT Pub. Date: Jun. 1, 2006

(65) Prior Publication Data
US 2009/0050586 A1 Feb. 26, 2009

(51) Int. Cl.
A47G 29/00 (2006.01)

(52) U.S. Cl. ............... 211/71.01; 211/59.2; 211/85.17; 211/126.15

(58) Field of Classification Search ............ 211/71.01, 211/59.2, 85.17, 126.1, 126.2, 126.15, 133.1, 211/126.13; 206/503, 506, 425; 312/184
See application file for complete search history.

(56) References Cited

U.S. PATENT DOCUMENTS

| | | | | |
|---|---|---|---|---|
| 803,102 A * | 10/1905 | Harris | ............ | 211/126.15 |
| 1,973,416 A * | 9/1934 | Otte | ............ | 108/143 |
| 2,959,298 A | 11/1960 | Pope | | |
| 3,019,071 A * | 1/1962 | Davis | ............ | 312/308 |
| 3,222,117 A * | 12/1965 | Schwartz | ............ | 312/264 |
| 3,232,442 A * | 2/1966 | Wilson | ............ | 211/133.2 |
| 3,393,808 A * | 7/1968 | Churchill | ............ | 211/59.2 |
| 3,499,539 A * | 3/1970 | Fisher | ............ | 211/59.2 |
| 3,606,513 A * | 9/1971 | Hoffman et al. | ............ | 312/351 |
| 3,977,529 A * | 8/1976 | Stroh | ............ | 211/187 |
| 4,105,126 A * | 8/1978 | Deffner et al. | ............ | 211/59.2 |
| 4,386,703 A * | 6/1983 | Thompson et al. | ............ | 206/557 |
| 4,598,828 A * | 7/1986 | Young et al. | ............ | 211/59.2 |
| 4,697,711 A * | 10/1987 | Noren | ............ | 211/182 |
| 4,790,707 A | 12/1988 | Magretta et al. | | |
| 5,240,124 A * | 8/1993 | Buday | ............ | 211/59.2 |
| 5,294,009 A * | 3/1994 | Maurer et al. | ............ | 211/126.15 |
| D358,727 S * | 5/1995 | Dickinson et al. | ............ | D6/470 |
| 5,531,464 A * | 7/1996 | Maurer et al. | ............ | 280/47.35 |
| 5,743,412 A | 4/1998 | Noble et al. | | |
| 5,829,767 A | 11/1998 | Grossman et al. | | |
| 6,095,347 A * | 8/2000 | Mauro-Vetter | ............ | 211/151 |
| 7,631,771 B2 * | 12/2009 | Nagel et al. | ............ | 211/59.3 |

OTHER PUBLICATIONS

International Search Report for PCT Application No. PCT/US2005/04263, mailed on Mar. 29, 2006.

* cited by examiner

Primary Examiner — Korie Chan
(74) Attorney, Agent, or Firm — Carlson, Gaskey & Olds

(57) ABSTRACT

A rack for supporting containers includes a pair of opposed side supports defining open front and rear ends. A plurality of canted rails for supporting containers are mounted on each of the opposed side supports. At least one stop member is mounted adjacent the front end of at least one of the rails to prevent containers from sliding out of the rack.

6 Claims, 5 Drawing Sheets

STORAGE RACK

BACKGROUND OF THE INVENTION

The present invention relates generally to a rack for supporting portable storage containers.

Portable storage containers that both stack and nest with similar containers are commonly used for transporting and storing goods. Nesting is typically achieved when an empty container receives a like container therein such that there is at least some overlap between the walls of the containers. The stacking feature is typically used when an occupied container has a like container supported thereon, such that the goods stored in the lower container are preferably not contacted or damaged by the upper container. Many containers use members known as bail members to achieve the stacking feature. Bail members may typically be positioned out of the way for purposes of nesting, but then moved to a stacking position for allowing containers to be stacked thereon.

The bail members in some containers are movable among several positions, such as: a nesting position, a first stack position and a second stack position. In the nesting position, the bail members are out of the way and the upper container can substantially nest within the lower container. The bail members support containers in the first stack position at a first distance from the floor, where the upper container is not substantially nested within the lower container. The bail members also can be moved to the second stack position to support the upper container at a second distance from the floor, where the upper container is partially nested within the lower container.

One container recently developed by the assignee of the present invention provides both a low nest position and a high nest position for the bail members. In the low nest position, a container stacked thereon will nest into the container significantly, thereby minimizing the total space occupied by the two containers, while still providing a minimal clearance between the floors of the two containers for short goods stored in the lower container.

In the high nest position, a little more storage space is provided between the floors of the stacked/nested containers, such that larger goods can be stored in the lower container without contact from the upper container. In the high nest position, the bail member is oriented such that a support portion of the bail member spaced upwardly from uppermost edges of the walls. The bail member is outward of the walls of the container, thus permitting the floor and the walls of the upper container to nest significantly into the lower container. The bail member engages a ledge protruding outwardly from an outer surface of the wall of the upper container. For shorter goods that fit between the floors of the upper and lower containers, this provides a very efficient overall stacking height of the containers.

In use at a store, such as in a freezer or refrigerator, the loaded containers might each contain different products. For convenience, each of the containers should be accessible independently, so that desired product can be retrieved without unstacking and restacking all of the containers. Therefore, at times it would be inconvenient simply to stack them one upon the other.

SUMMARY OF THE INVENTION

A rack for supporting containers includes a pair of opposed side supports defining open front and rear ends. A plurality of rails for supporting containers are mounted on each of the opposed side supports. The rails are angled downwardly toward the front of the rack, such that containers automatically slide to the front of the container. At least one stop member is mounted adjacent the front end of at least one of the rails to prevent containers from sliding out of the rack.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
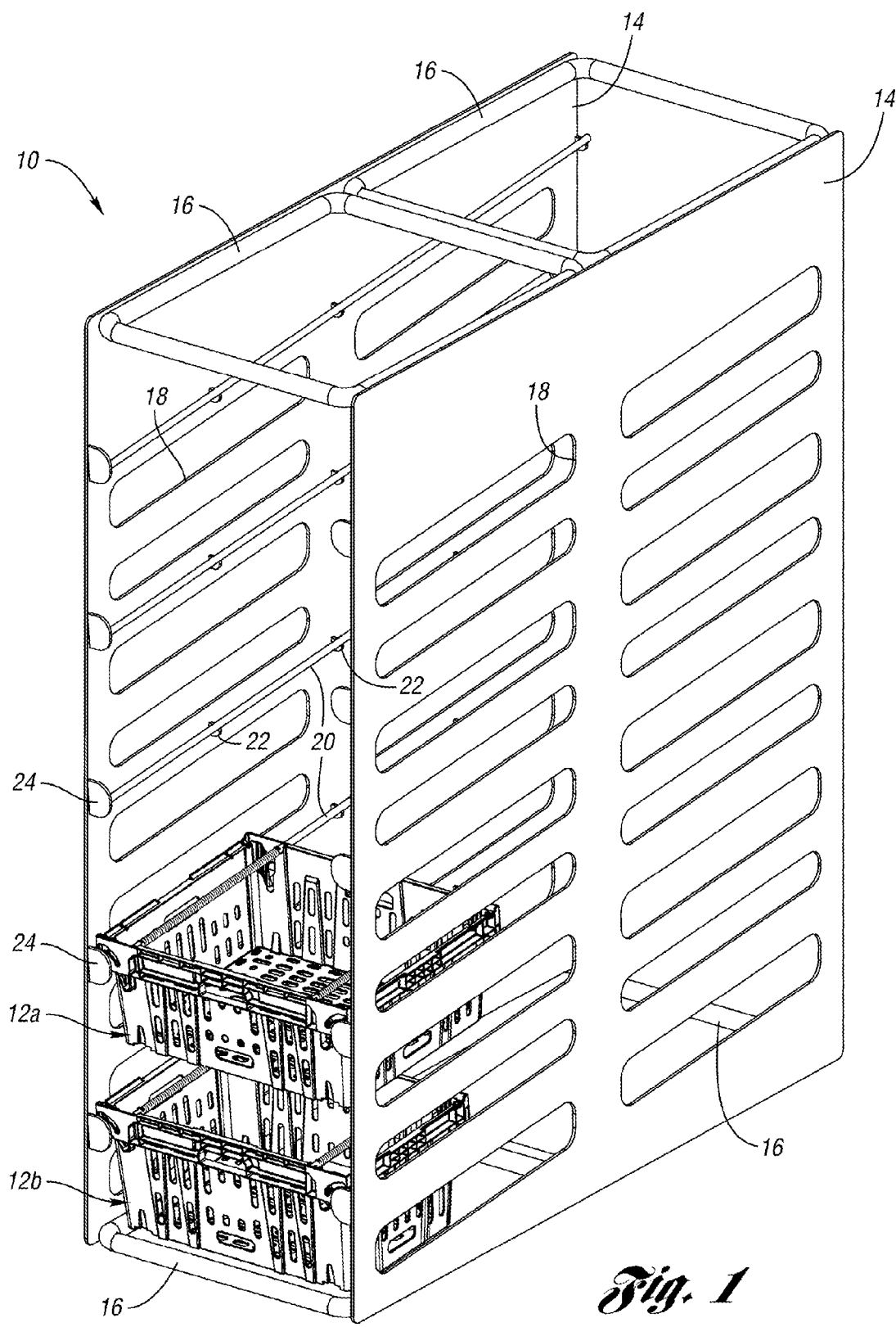
FIG. 1 illustrates a container storage rack according to the present invention with two containers supported thereon.

A storage rack 10 according to the present invention is shown in FIG. 1 supporting two containers 12a, b. The rack 10 includes a pair of opposed side supports 14 (e.g. side walls) connected via one pair of tubular, rectangular frames 16 at the top and another pair of frames 16 at the bottom of the rack 10. The ends of the rack 10 are substantially open, as shown. A plurality of elongated ventilation openings 18 are formed through the side supports 14.

A plurality of rails 20 are mounted on the interior surface of each of the side supports 14. The rails 20 are supported at vertically spaced intervals by brackets 22. As can be seen more clearly in FIGS. 2 and 3, the rails 20 are canted from the rear of the rack 10 to a front of the rack 10 where they are each supported at an axial end by a large stop 24 secured to the interior surface of the side support 14. The ventilation openings 18 are preferably parallel to the rails 20 as shown. The angled orientation of rails 20 also serves as a means to help impede the containers 12 from falling out the rear of rack 10. However, more mechanical means, such as a rear stop, bar, or other type of locking mechanism, may also be used in the rear of rack 10 to achieve the same purpose.

Each of the containers 12a, b is supported at opposite ends by a rail 20 on each of the side supports 14 of the rack 10. The containers 12a, b are slidable on the rails 20, such that they slide down the rails 20 from the rear of rack 10 to the front of rack 10 until they abut the stops 24 at the end of the rails 20, or until they abut another container. The open ends of the rack 10 permit containers 12a, b to be loaded onto the rails 20 at the rear of the rack 10 and unloaded from the rails 20 at the front of the rack 10.

Figure 2:
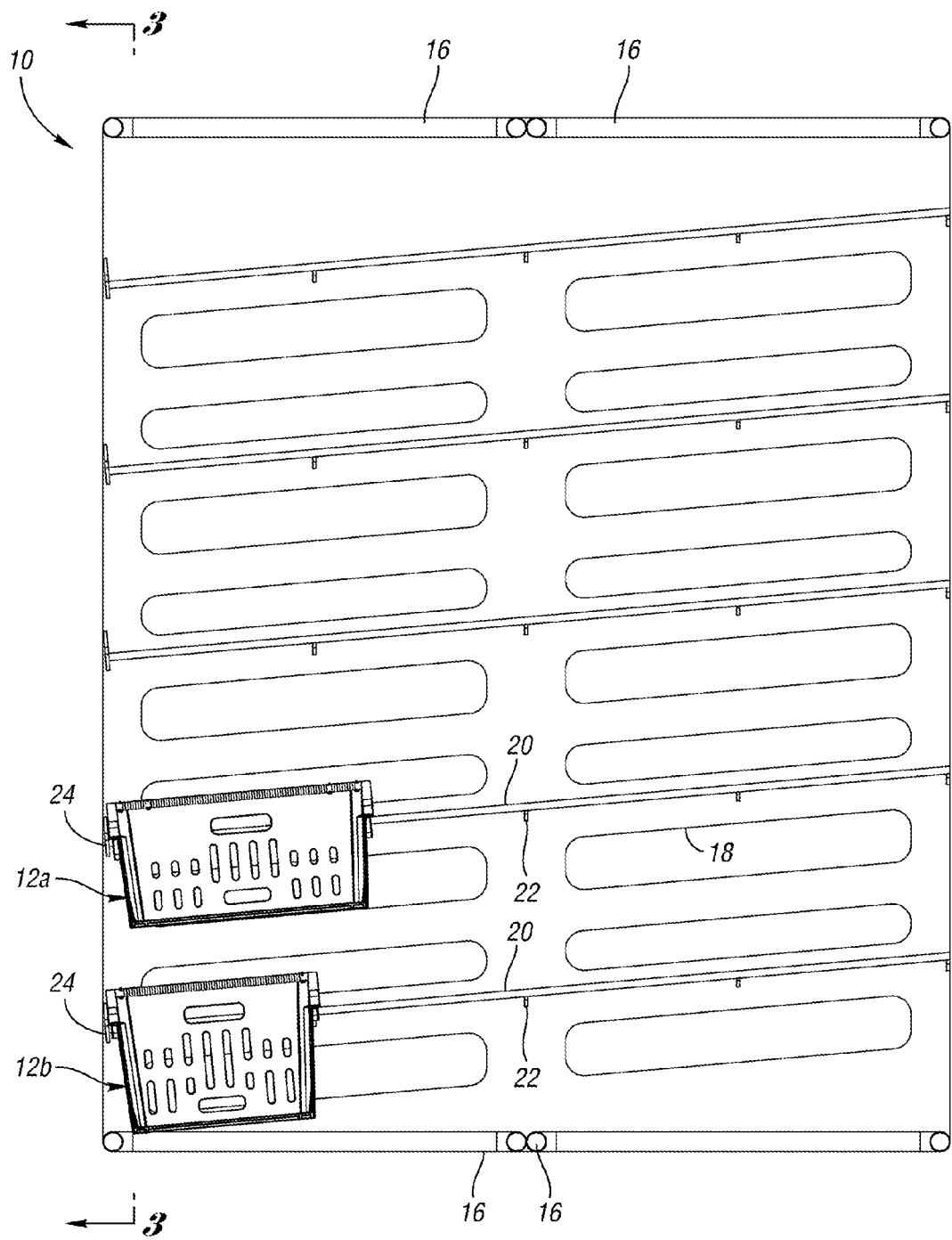
FIG. 2 is a longitudinal sectional view through the rack and containers of FIG. 1.
Figure 3:
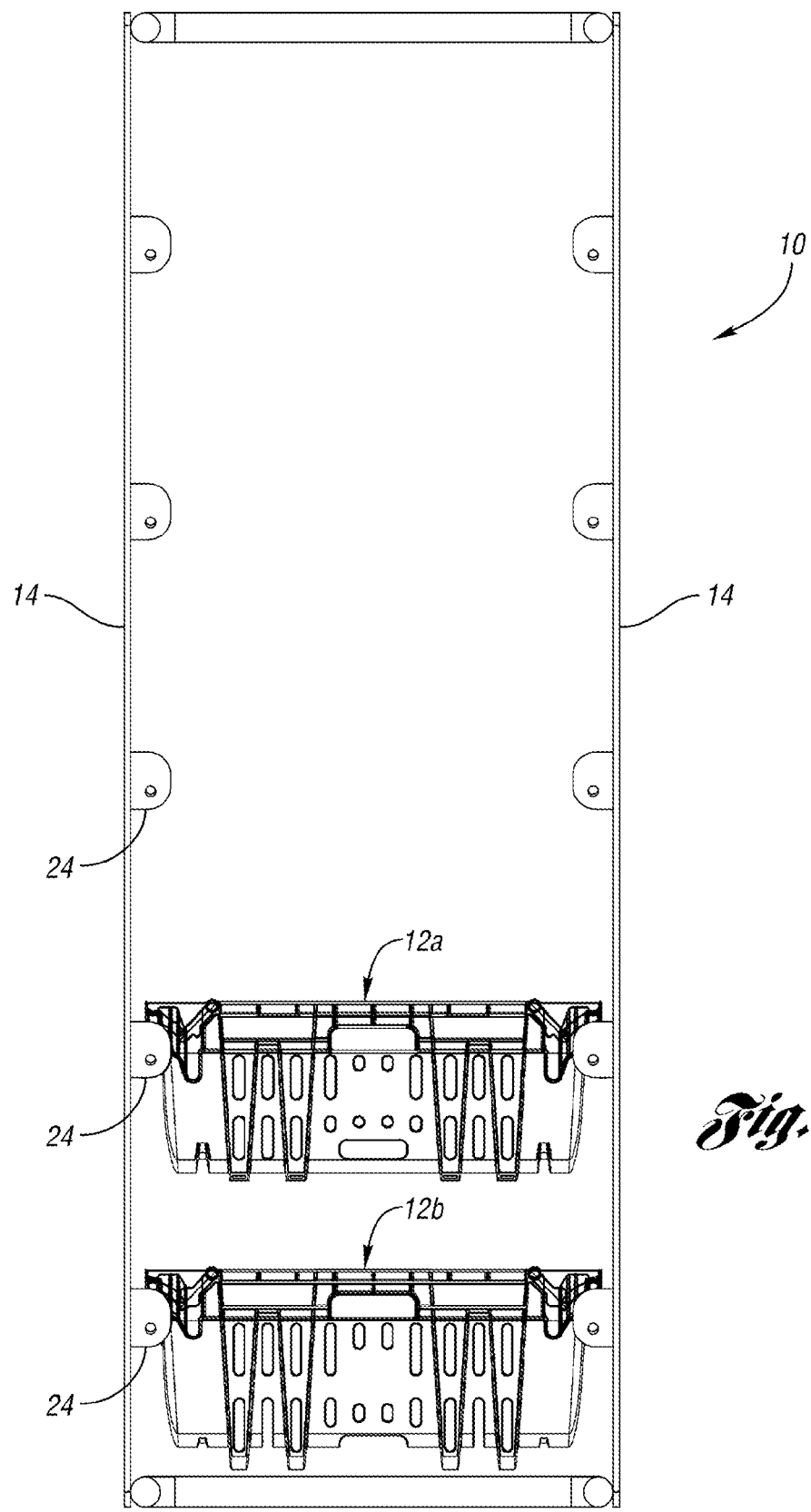
FIG. 3 is a sectional view taken along line 3-3 through the rack and containers of FIG. 2.
Figure 4:
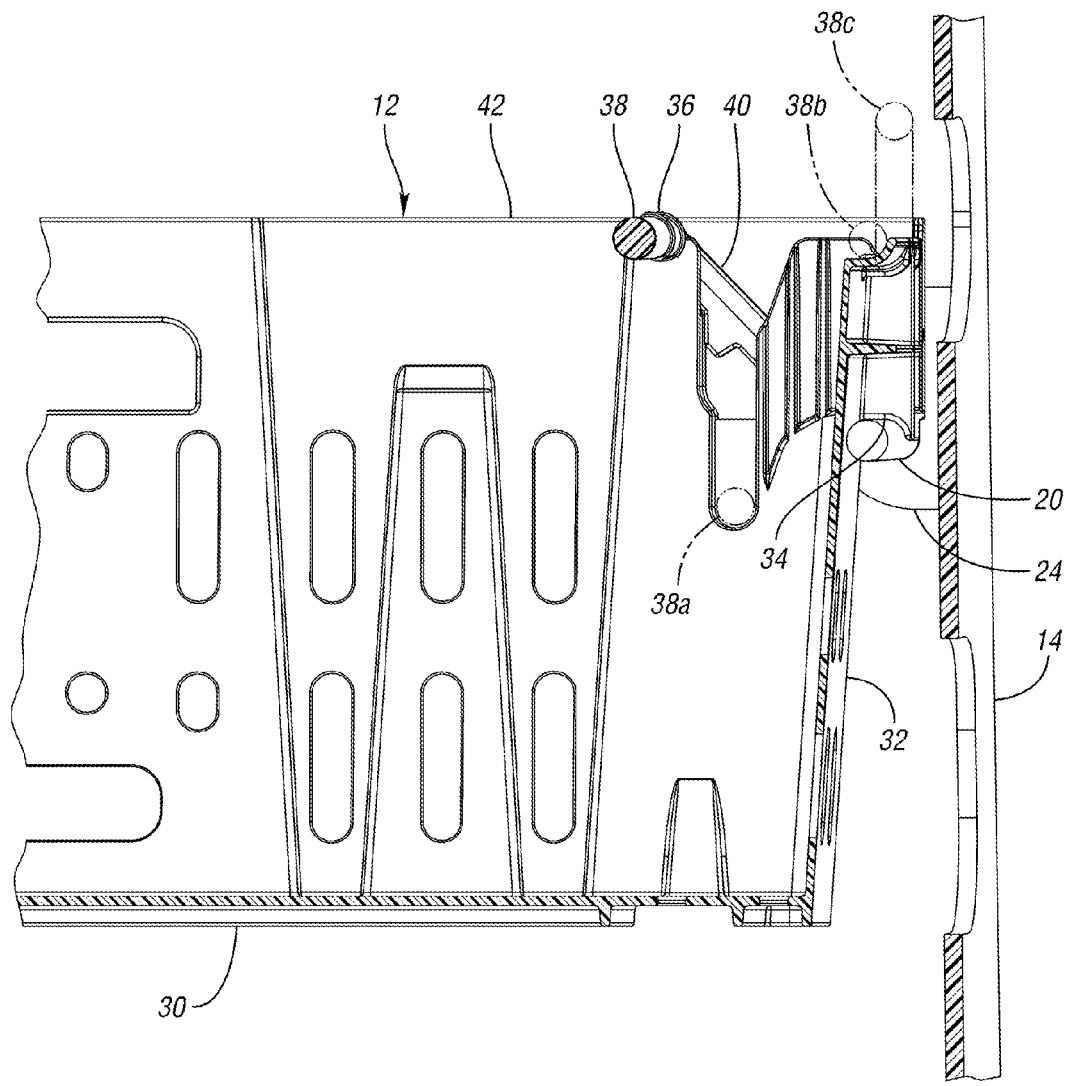
FIG. 4 is an enlarged sectional view showing one container supported on the rack of FIG. 1.

As shown in FIG. 4, each of the containers (represented generically as "12" to refer to either container 12a, b of FIGS. 1-3) is supported at each side support 14. The container 12 includes a floor 30 up from which extends end walls 32 each having a lip 34 projecting outwardly. The container 12 includes a pair of bail members 36 each having a generally cylindrical support portion 38 extending between arms 40, which are pivotably mounted to side walls 42 of the container. The support portion 38 of the bail members 36 are pivotable among a high stack position 38 as shown, a low stack position 38a, a low nest position 38b and a high nest position 38c. In the high nest position 38c, the support portion 38 is vertically aligned with the lip 34 outward of the end wall 32.

Figure 5:
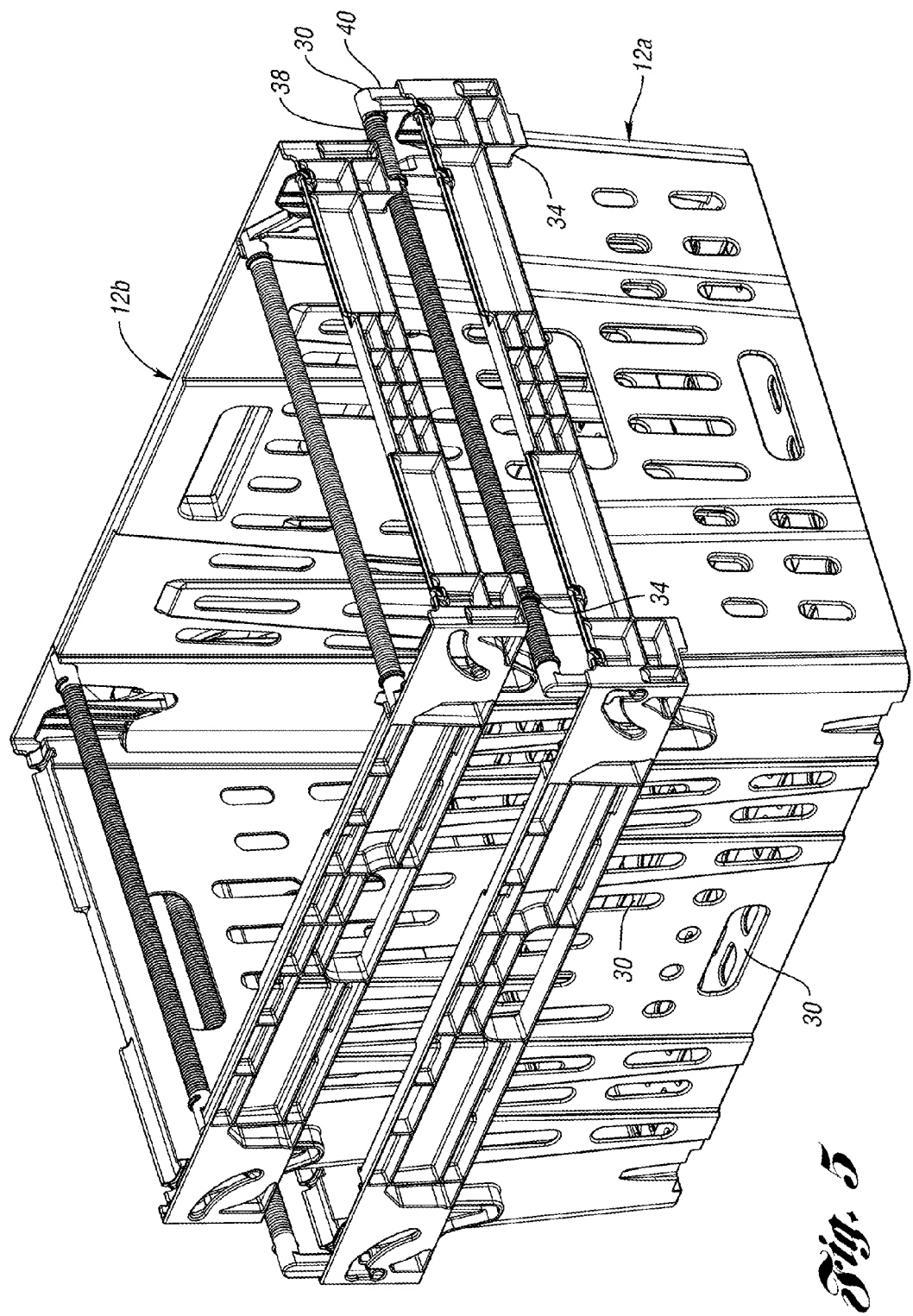
FIG. 5 illustrates the containers of FIG. 1 stacked one upon the other.

FIG. 5 illustrates the two containers 12a,b with the bail member 36 of the lower container 12a in the high nest position. In the high nest position, the support portion 38 abuts the lip 34 of the upper container 12b in a substantially nested position, which leaves room for shorter goods between the floors 30 of the containers 12a, b. The same lip 34 that supports the container 12b in the high nest position (FIG. 5) supports the container 12 on the rails 20 of the rack 10 (FIGS. 1-4). The lip 34 of the lower container 12a is configured such that it would similarly contact a support portion 38 of a like container in which the container 12a could be nested.

The rack 10, including the side supports 14, rails 20, brackets 22, stops 24 and frames 60, may be constructed of steel or other metals, but may also be formed of plastic or any other material having the desired properties. The rack 10 may optionally include wheels mounted to the lower frames 60. The side walls 42, end walls 32 and floor 30 of the containers 12a, b are integrally molded as a single unitary structure from a plastic material such as polypropylene, but other suitable materials could also be used. The bail members 36 are preferably steel, but could also be glass-filled nylon or other composite material.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, there are different types of containers that could be used with the rack 10 disclosed above. Similarly, modifications could be made to the disclosed rack 10 within the scope of the present invention.

The invention claimed is:

1. A rack supporting containers comprising:
the rack including:
a pair of opposed side supports, wherein the side supports define an open rear end and an open front end, wherein the side supports include ventilation openings;
a top frame connecting upper ends of the side supports;
a bottom frame connecting lower ends of the side supports;
a plurality of cantilevered brackets on each of the opposed side supports;
a plurality of canted rails mounted on each the brackets of the opposed side supports,
wherein the rails are elongated rods, wherein the ventilation openings are generally parallel to the rails; and
at least one stop member adjacent at least one of the rails, wherein the at least one stop member is adjacent the front end of the rack;
wherein a plurality of containers are supported on the plurality of rails, the plurality of containers each including a pair of opposed walls extending upward from a floor, each of the opposed walls including an outward protrusion resting on one of the plurality of rails, each of the plurality of containers including a support pivotable between a support position directly above the floor and an open position not directly above the floor.

2. The rack according to claim 1 wherein the rails are canted downward from the rear end to the front end.

3. The rack and containers of claim 1 wherein the support is pivotable to a stack position vertically aligned with the protrusion.

4. A rack holding a plurality of containers,
the rack including a pair of opposed side supports, a plurality of canted rails mounted on each the opposed side supports, and at least one stop member adjacent at least one of the rails,
each of the containers including a pair of opposed walls extending upward from a floor, each of the opposed walls including an outward protrusion resting on one of the plurality of rails above the floor, wherein each of the plurality of containers includes a support pivotable between a support position directly above the floor and an open position not directly above the floor.

5. The rack and containers of claim 4 wherein the support is pivotable to a stack position vertically aligned with the protrusion.

6. The rack and containers of claim 4 wherein each of the opposed walls of each of the containers is adjacent one of the pair of opposed side supports.

* * * * *